July 15, 1930.                    L. GRAUMAN                    1,770,611
                               LIQUID DISPENSER
                            Filed March 17, 1928
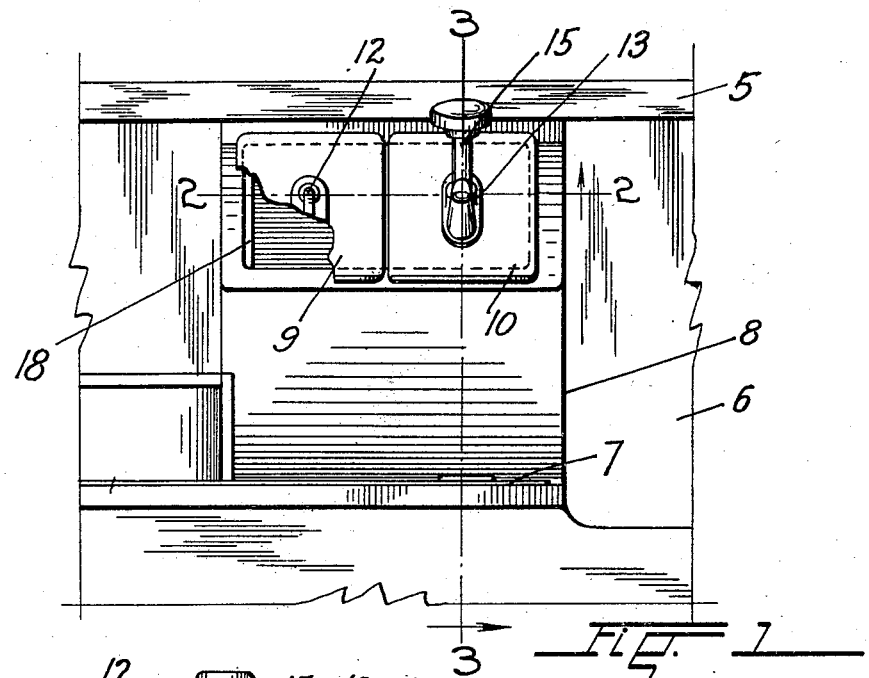
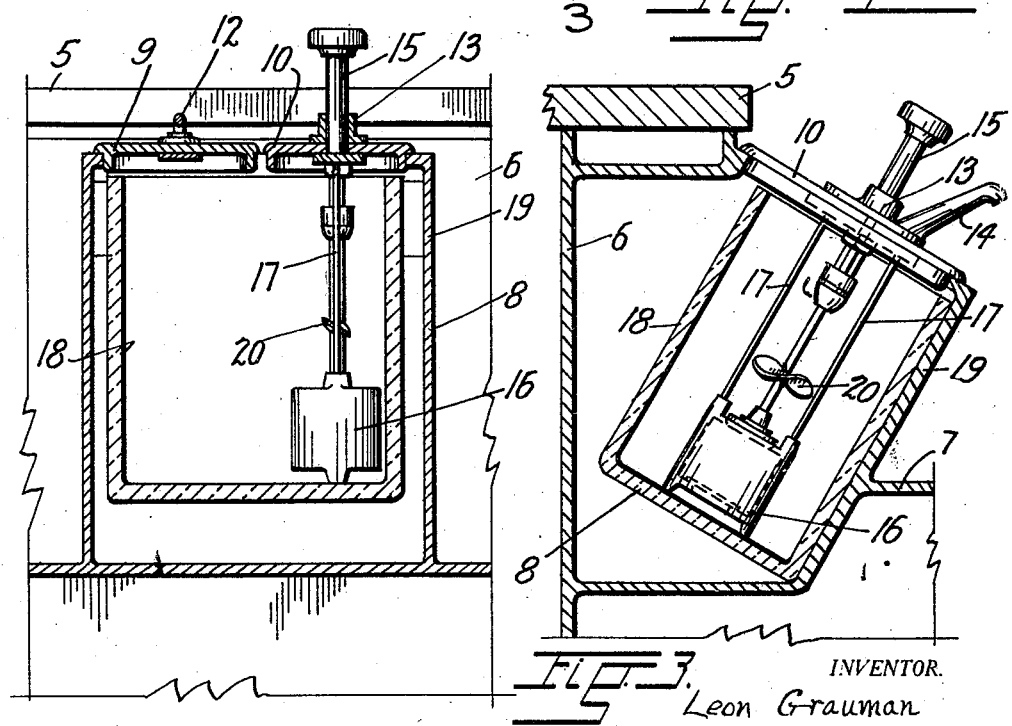
INVENTOR.
Leon Grauman
BY
ATTORNEY.

Patented July 15, 1930

1,770,611

UNITED STATES PATENT OFFICE

LEON GRAUMAN, OF DENVER, COLORADO

LIQUID DISPENSER

Application filed March 17, 1928. Serial No. 262,466.

This invention relates to improvements in soda fountains and more particularly to the element thereof by which milk or chocolate and other syrups are stored in convenient vicinity to a pump device capable of drawing the liquids into vessels, for use in the preparation of diverse beverages.

In soda fountain structures at present in use the arrangement of the container for the milk and other liquids, and the pump, is such that whenever the container is supplied with fresh liquid, the pump must be removed with the lid normally covering the container or some other laborious and time-taking operation or adjustment is required by reason of the presence of the pump device.

It is an object of the present invention to provide a jar unit for soda fountains, of the above-described character which may be filled with liquid without disturbing or interfering with the pump by which the liquid is drawn from the unit.

A further object of the invention is to provide in a unit of this kind, means for agitating the liquid contents thereof by the operation of the pump, which is especially desirable for mixing cream and milk, and still other objects reside in details of construction and a novel arrangement of parts as will fully appear in the course of the following description.

An embodiment of my invention has been shown in the accompanying drawings, in which like characters of reference designates corresponding parts throughout the views, and in which—

Figure 1 represents a partially broken face view of a jar unit constructed in accordance with my invention, in its operative position with relation to the splash-back and work-board of a soda fountain structure;

Figure 2, a section taken in a slanting plane indicated by the line 2—2 in Figure 1; and Figure 3, an enlarged section taken on the line 3—3 of Figure 1.

Referring further to the drawings, 5 designates the counter of a soda fountain structure, 6 the splash-back, and 7 the work-board of the same.

The jar unit, designated in its entirely by the numeral 8, comprises a container slanting forwardly from the splash-back. The container is oblong in cross section and its open top is normally covered by two flanged lids 9 and 10 placed side by side.

One of the lids has a handle 12 for its manipulation and the other lid is equipped with a flanged top 13 for the support of the spout 14 of a pump element and for the guidance of the reciprocating plunger rod 15 of the same.

The cylinder 16 of the pump element is suspended from the lid of the container by rods 17 and it is in its operative position supported on the bottom of the container immediately beneath the lid. The container proper preferably consists of a porcelain jar 18 enclosed in a housing 19 formed integral with the fountain structure.

The lids covering the container as stated hereinbefore, are supported upon the housing and the space in the housing around the jar may be filled with ice for the purpose of cooling and preserving the contents of the container.

The stem portion of the pump element within the container carries an agitator 20, preferably in the form of opposed screw-blades, which when the stem is moved in the operation of the pump, stirs the liquid contents of the jar. The agitator is preferably made in the form of a helical propeller, and by rotating the plunger rod, the milk may be stirred without operating the pump. The agitator is particularly advantageous in the use of milk inasmuch as it mixes the cream with the milk before it is drawn through the spout of the pump and into a vessel held beneath the same, when the stem is revolved or turned.

Having thus described the mechanical construction of my invention, its advantages will be readily apparent. After the container has been filled it is closed by the two lids and any part of its contents may be discharged into a vessel held beneath the spout of the pump, by manual reciprocation of the stem 15 of the same.

During the operation of the pump, the contents of the container are stirred by the agitator so that liquids having separable components such as cream and milk, are thoroughly mixed before they are discharged from the container.

To refill the jar after it has been emptied, it is but necessary to remove the lid 9. The lid 10 and the pump remain in place and are removed only for cleaning purposes or repair.

It will thus be seen that my improved jar unit has many advantages over those at present in use, which require the removal of the entire pump-mechanism each time the unit is supplied with fresh material.

The construction of the improved unit is simple and practical and its position with relation to the work-board of the fountain permits of its being placed in convenient vicinity to the refrigerated vats in which the milk bottles are stored.

What I claim and desire to secure by Letters Patent is:

1. In a soda fountain structure, a jar, a pump in the jar having a rotary stem projecting outside the same, and an agitator on the stem within the jar.

2. In a soda fountain structure, a jar, a pump in the jar having a rotary reciprocating stem projecting outside the same, and an agitator on the stem within the jar.

In testimony whereof I have affixed my signature.

LEON GRAUMAN.